United States Patent
Bedard et al.

(10) Patent No.: US 9,656,724 B2
(45) Date of Patent: May 23, 2017

(54) SNOWMOBILE SKI TIP (71) Applicant: BOMBARDIER RECREATIONAL PRODUCTS INC., Valcourt (CA)

(72) Inventors: Yvon Bedard, Orford (CA); Pascal Gagnon, Valcourt (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 77 days.

(21) Appl. No.: 14/623,262

(22) Filed: Feb. 16, 2015

(65) Prior Publication Data
US 2016/0236752 A1   Aug. 18, 2016

(51) Int. Cl.
*A63C 5/052*   (2006.01)
*B62M 27/02*   (2006.01)
*B62B 17/02*   (2006.01)
*A63C 5/06*   (2006.01)
*B62B 13/00*   (2006.01)

(52) U.S. Cl.
CPC .......... *B62M 27/02* (2013.01); *A63C 5/062* (2013.01); *B62B 13/00* (2013.01); *B62B 17/02* (2013.01); *B62M 2027/025* (2013.01)

(58) Field of Classification Search
CPC ........ B62M 29/00; A63C 5/062; A63C 5/052; B62B 13/00
See application file for complete search history.

(56) References Cited

U.S. PATENT DOCUMENTS

| | | | | |
|---|---|---|---|---|
| 3,424,469 A * | 1/1969 | Hooker | .......... | A63C 5/062 280/608 |
| 3,482,849 A * | 12/1969 | Puetz | .......... | B62M 27/02 180/182 |
| 3,720,421 A * | 3/1973 | Clemmer | .......... | B62B 17/02 180/182 |
| 4,180,275 A * | 12/1979 | Montoya | .......... | A63C 5/062 280/28 |
| 5,310,221 A * | 5/1994 | Schmidt | .......... | A63C 5/062 280/809 |
| 5,443,278 A * | 8/1995 | Berto | .......... | A63C 5/04 280/21.1 |
| D474,131 S * | 5/2003 | Lobson | .......... | D12/7 |
| 6,945,563 B2 * | 9/2005 | Clausing | .......... | A63C 5/052 280/809 |
| 7,195,254 B2 * | 3/2007 | Makitalo | .......... | B62B 17/02 280/22 |

(Continued)

FOREIGN PATENT DOCUMENTS

| | | | | |
|---|---|---|---|---|
| DE | 2638928 A1 * | 3/1978 | .......... | A63C 5/052 |
| DE | 2835795 A1 * | 2/1980 | .......... | A63C 5/062 |

OTHER PUBLICATIONS

Snowmobile Ski Skins internet advertisement (commercially available at least as of Feb. 8, 2013 from www.snowmobileparts.com.*

Primary Examiner — J. Allen Shriver, II
Assistant Examiner — Steve Clemmons
(74) Attorney, Agent, or Firm — BCF LLP (57) ABSTRACT

A snowmobile ski tip is configured to be removably fitted over a snowmobile ski and has a bottom surface for contacting the snow and a top surface configured to contact a bottom surface of the ski, a side wall, and a top wall extending from the side wall. The ski tip forms a pocket configured to accept a front end of the snowmobile ski such that the ski tip widens at least the front end of the ski when installed.

19 Claims, 9 Drawing Sheets (56) References Cited

U.S. PATENT DOCUMENTS 7,789,400 B2 * 9/2010 Lachance ............... B62B 17/02
 280/28
2015/0375086 A1 * 12/2015 Yi ........................... A63C 5/03
 280/600

* cited by examiner

SNOWMOBILE SKI TIP

TECHNICAL FIELD

The present technology relates generally to a snowmobile ski and more particularly to a removable ski tip for a snowmobile ski.

BACKGROUND

Snowmobiles are used in a wide variety of snow conditions and thus the ski, which supports the snowmobile on the snow, will react differently to the different snow conditions. As a result, the snowmobiles behavior is altered. Different skis react differently to these snow conditions and can be changed to adapt a snowmobile to a driver's desired behavior.

Therefore there exists a desire for a device to make a ski react differently to different snow conditions.

SUMMARY

It is an object of the present technology to ameliorate at least some of the inconveniences present in the prior art.

The present technology provides a snowmobile ski tip for a snowmobile ski. The ski tip has a body, the body having a bottom surface for contacting snow and a top surface for contacting a bottom surface of the ski, a side wall extending from the top surface of the body, and a top wall extending from the side wall. The body, the side wall and the top wall form a pocket for receiving a front end of the ski.

According to some implementations of the present technology, a top wall extends from the side wall at a height along the side wall that is greater than a thickness of the ski.

According to some implementations of the present technology, the side wall extends vertically upward from the body and extends at least partially adjacent a peripheral edge of the body. The side wall is a right side wall on a right side of a longitudinal centerline of the body and a left side wall on a left side of the longitudinal centerline.

According to some implementations of the present technology, the top wall is a left top wall and a right top wall. The right top wall extends laterally from the right side wall toward the longitudinal centerline and the left top wall extends laterally from the left side wall toward the longitudinal centerline.

According to some implementations of the present technology, the body has a right side peripheral edge and a left side peripheral edge both extending from a rear end toward a front end of the body. The body has a first width between the right side and left side peripherals edges at the rear end of the body and a second width between the right side and left side peripherals edges at the front end of the body. The first width is greater than the second width such that a width of the body narrows from the rear end to the front end of the body.

According to some implementations of the present technology, the right side wall is distanced from the left side wall so as to create a gap therebetween. The gap has a first dimension near the rear end of the body and a second dimension near the front end of the body such that the gap decreases from the rear end of the body to the front end of the body.

According to some implementations of the present technology, the body defines an open-ended notch for receiving a portion of a keel of the ski. The notch opens toward the rear end of the body such that when the ski tip is installed onto the ski, a portion of the keel of the ski enters through the notch and a portion of the body extends along the keel.

According to some implementations of the present technology, the notch has a right side, a left side and a front side, and the right side wall and the left side wall extend rearward of the front side of the notch.

According to some implementations of the present technology, the ski tip also has at least one reinforcing rib between the right side wall and the top surface of the body within the peripheral edge of the body and at least one reinforcing rib between the left side wall and the top surface of the body within the peripheral edge of the body.

According to some implementations of the present technology, the top surface of the body is free of walls and ribs between a rear edge of the body and rear ends of the left and right side walls.

According to some implementations of the present technology, the left top wall has a first width extending in the lateral direction of the ski tip between the left side wall and an inner lateral edge of the left top wall and the right top wall has a second width extending in the lateral direction of the ski tip between the right side wall and an inner lateral edge of the right top wall such that an opening between the left top wall and the right top right is allows a handle of the ski to pass therethrough.

According to some implementations of the present technology, the opening between the lateral edges of the left top wall and the right top wall is narrower than a gap between the right side wall and the left side wall.

According to some implementations of the present technology, the gap between the right side wall and the left side wall is slightly larger than a corresponding width of the ski.

According to some implementations of the present technology, the first width and the second width of the ski tip are greater than corresponding widths of the.

For purposes of this application, terms related to spatial orientation such as forward, rearward, front, rear, upper, lower, left, and right, are as they would normally be understood by a driver of the vehicle sitting thereon in a normal driving position with the vehicle being upright and steering the skis in a straight ahead direction.

Implementations of the present technology have at least one of the above-mentioned object and/or aspects, but do not necessarily have all of them.

Additional and/or alternative features, aspects, and advantages of implementations of the present technology will become apparent from the following description, the accompanying drawings, and the appended claims.

BRIEF DESCRIPTION OF THE DRAWINGS

Further features and advantages of the present technology will become apparent from the following detailed description, taken in combination with the appended drawings, in which.

DETAILED DESCRIPTION

The present technology will be described below with respect to a snowmobile and a snowmobile ski designed to accommodate a ski tip. However, it is contemplated that some aspects of the present technology could be adapted for use on other kinds of snowmobile and snowmobile skis With reference to FIG. 1, a snowmobile 10 includes a front end 12 and a rear end 14 which are defined consistently with a travel direction of the snowmobile 10. The snowmobile 10 includes a vehicle body in the form of a frame or chassis 16 which includes a rear tunnel 18. The tunnel 18 is formed from sheet metal parts assembled to form an inverted U-shape when viewed from the front or rear ends 12, 14. The inverted U-shaped tunnel 18 has a left side portion 18a and a right side portion 18a (only the right side portion 18a being seen in the figures). Each side portion 18a is bent laterally outwardly at its bottom edge to form a corresponding footrest 64.

A motor 26 (schematically illustrated in FIG. 1) is carried in a motor compartment defined by the motor support structure 20 of the frame 16. In the present implementation, the motor 26 is an internal combustion engine 26, but it is contemplated that other types of motors could be used. A fuel tank 28, supported above the tunnel 18, supplies fuel to the engine 26 for its operation.

Figure 1:
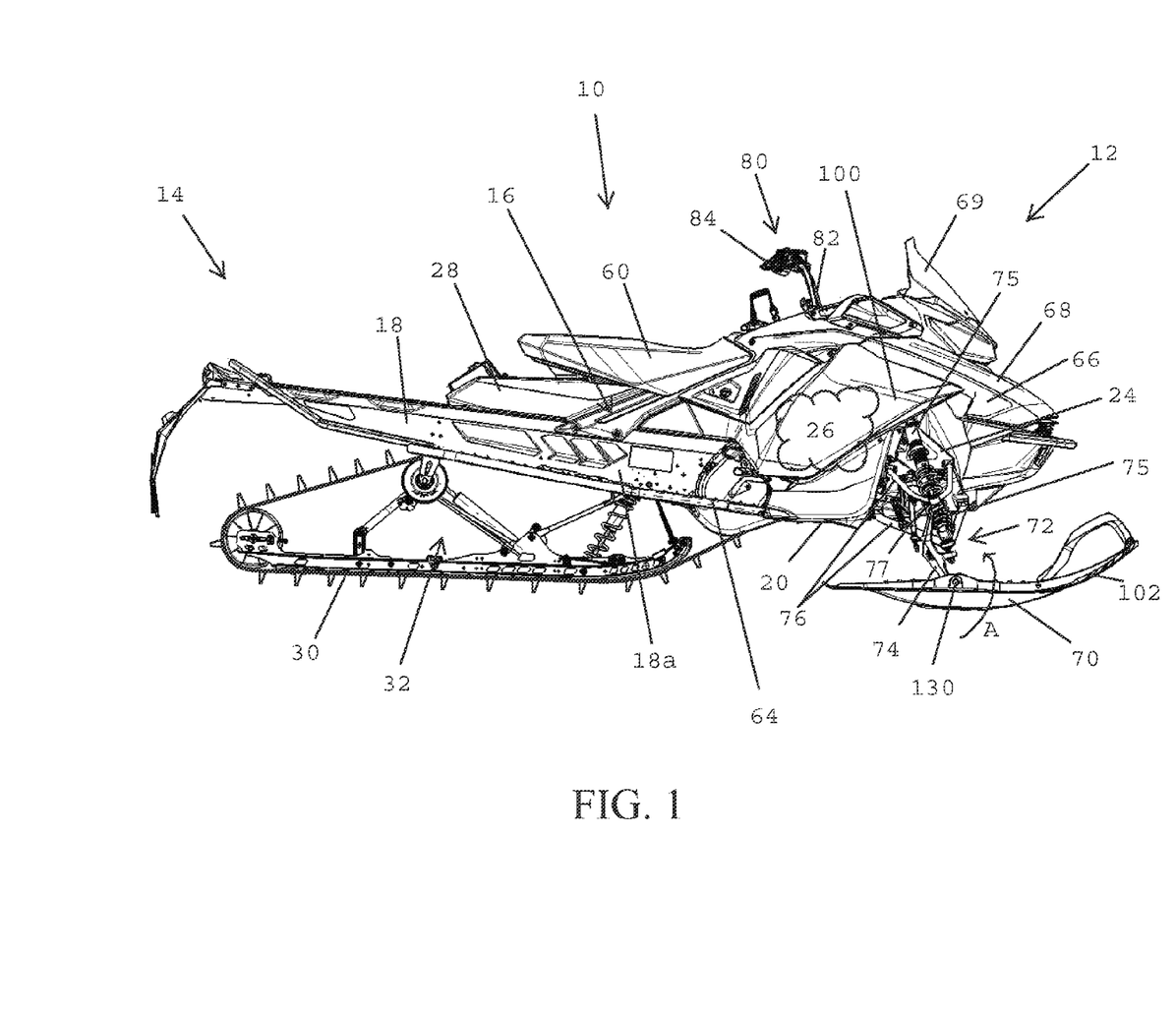
FIG. 1 is a right side elevation view of a snowmobile.

An endless drive track 30 is positioned generally under the tunnel 18, and is operatively connected to the engine 26 through a belt transmission system (not shown) and a reduction drive (not shown). The endless drive track 30 is driven to run about a rear suspension assembly 32 connected to the frame 16 for propulsion of the snowmobile 10.

A straddle-type seat 60 is positioned atop the fuel tank 28. The footrests 64 are positioned on each side of the snowmobile 10 below the seat 60 to accommodate the driver's feet (only the right footrest 64 is shown in the figures). Each of the left and right footrests 64 extends generally laterally outwardly from the corresponding left and right side portion 18a of the tunnel 18.

At the front end 12 of the snowmobile 10, fairings 66 enclose the engine 26, the belt transmission system and other components of the power pack such as the air intake system. The fairings 66 include a hood 68 which can be opened/removed to allow access to the engine 26 and other internal components of the snowmobile 10 for inspection or maintenance of the engine 26 and/or power pack. The fairings 66 also include a left side panel (not shown) extending on a left side of the snowmobile 10 and a right side panel 100 extending on a right side of the snowmobile 10. The engine 26 and the transmission system are disposed between the left and right side panels 100. A windshield 69 connected to the fairings 66 acts as a wind screen to lessen the force of the air on the rider while the snowmobile 10 is moving.

Two skis 70 (only the right side ski 70 being shown) positioned at the front end 12 of the snowmobile 10 are attached to the front suspension assembly 72. The skis 70 are provided with ski tips 102 (only the right side ski tip 102 being shown). The ski 70 and ski tip 102 will be described in more detail below. The front suspension assembly 72 includes ski legs 74, shock absorbers 75, supporting arms 76 and ball joints (not shown) for operatively connecting to the respective ski leg 74 and supporting arms 76.

A steering assembly 80, including a steering column 82 and a handlebar 84, is provided generally forward of the seat 60. The steering column 82 is rotatably connected to the frame 16. The lower end of the steering column 82 is connected to the ski legs 74 via steering rods 77 and ball joints (not shown). The handlebar 84 is attached to the upper end of the steering column 82. The handlebar 84 is positioned in front of the seat 60. The handlebar 84 is used to rotate the steering column 82, and thereby the skis 70, in order to steer the snowmobile 10.

The snowmobile 10 includes other components such as a display cluster, an exhaust system, an air intake system, and the like. As it is believed that these components would be readily recognized by one of ordinary skill in the art, further explanation and description of these components will not be provided herein.

Turning now to FIGS. 2 to 7, the right ski 70 and right ski tip 102 will be described. As the left ski 70 and left ski tip 102 are identical to the right ski 70 and the right ski tip 102, they will not be described herein. It is contemplated that the right ski 70 and the right ski tip 102 could be asymmetrical, in which case the left ski 70 an the left ski tip 102 would be minor images of the right ski 70 and the right ski tip 102. It is also contemplated that the right ski 70 and right ski top 102 could have more or less features than the left ski 70 and left ski tip 102 and/or features that differ from each other.

Figure 2:
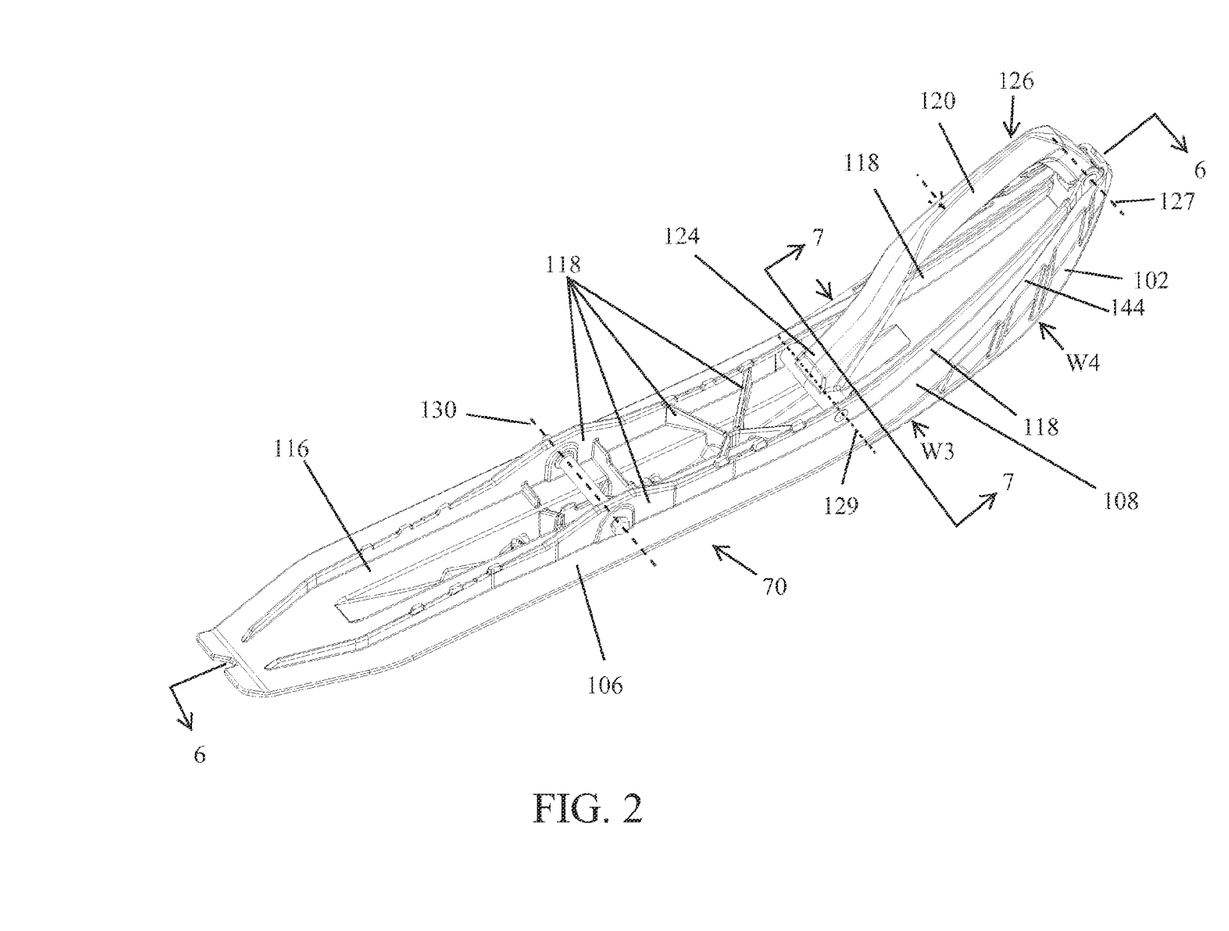
FIG. 2 is a perspective view taken from a rear, right side of a ski and ski tip of the snowmobile of FIG. 1.
Figure 5:
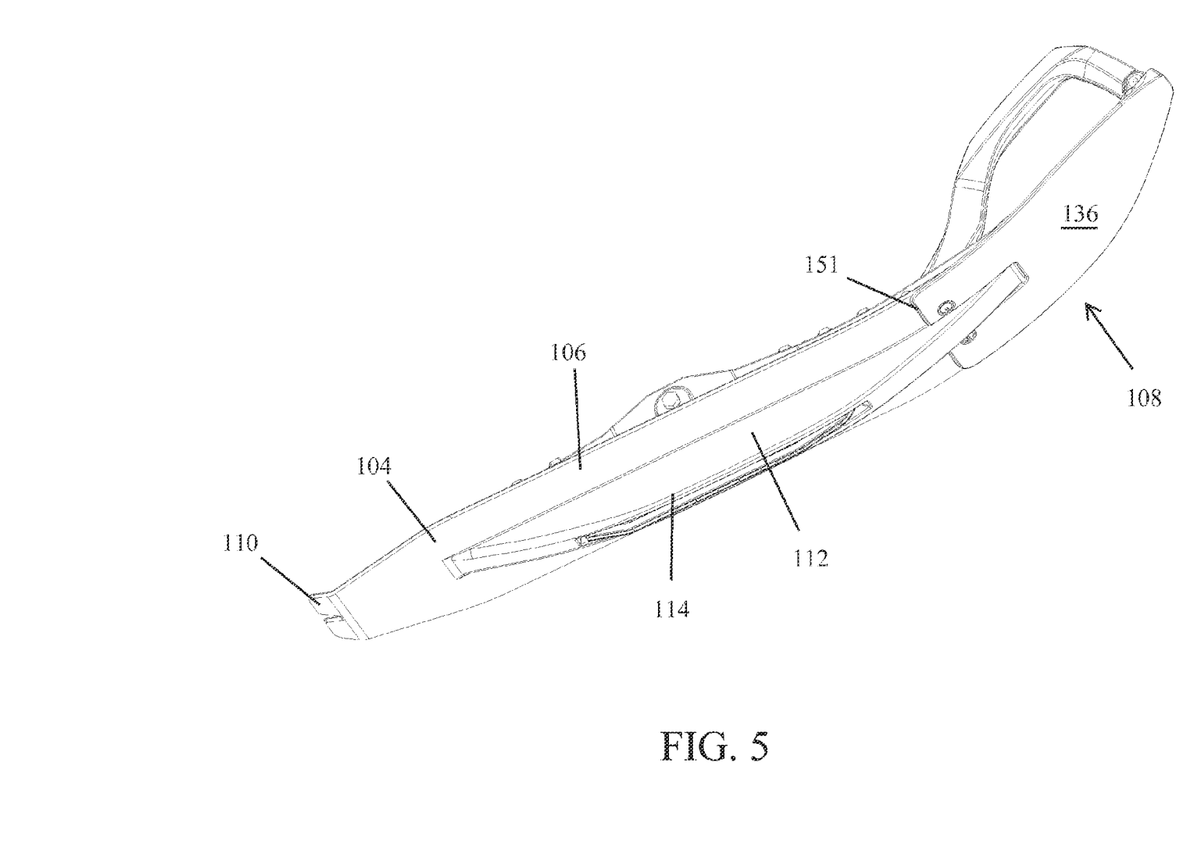
FIG. 5 is a bottom perspective view taken from a front, right side of the ski and ski tip of FIG. 2.
Figure 6:
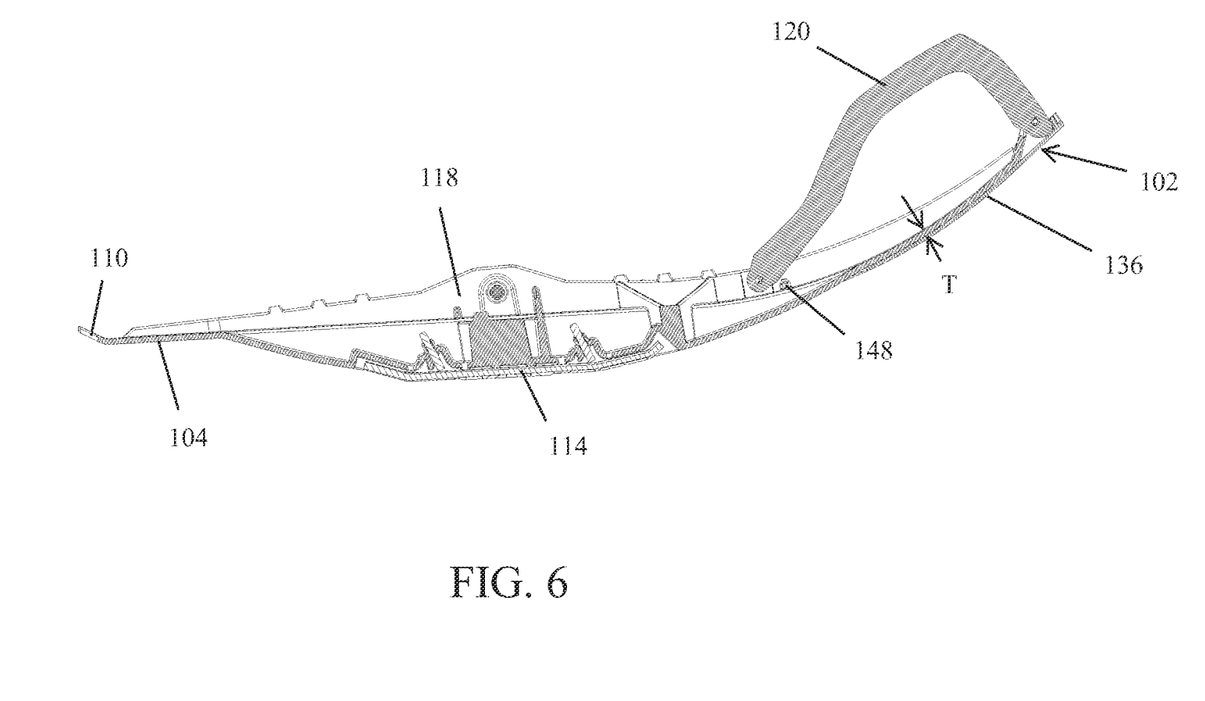
FIG. 6 is a cross-sectional view of the ski and ski tip of FIG. 2, taken along line 6-6 of FIG. 2.

FIG. 2 shows the ski 70 with the ski tip 102 installed to the front portion thereof. Both the ski 70 and ski tip 102 can be fabricated from Ultra-high-molecular-weight polyethylene (UHMWPE) or any other suitable material. Referring to FIG. 5, the ski 70 includes a lower running surface 104 having a generally flat middle section 106, an upturned front end 108 (FIG. 2) and an upturned rear end 110. The lower running surface 104 generally provides floatation for the ski 70 such that the ski 70 will bear the weight of the snowmobile 10 on top of the snow over which the snowmobile 10 is operated. A keel 112 extends downward from the lower running surface 104. A runner and carbide assembly 114 is attached to the lower side of the keel 112. The keel 112 and the runner and carbide assembly 114 provide steering for the ski 70 when the handlebar 84 is turned.

Figure 3:
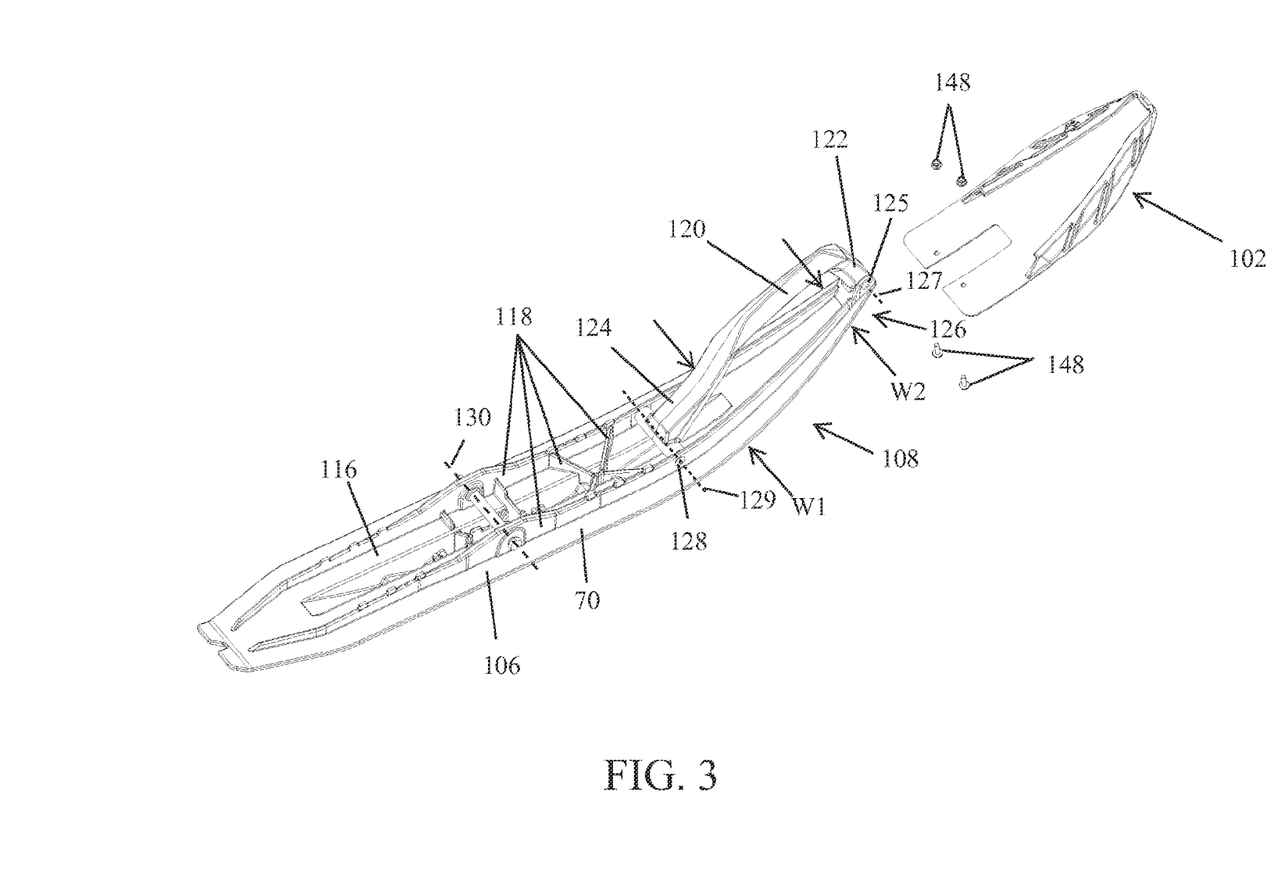
FIG. 3 is a perspective view taken from a rear, right side of the ski and ski tip of FIG. 2 with the ski tip removed from the ski.

With reference to FIGS. 2 and 3, the ski 70 also includes and upper surface 116 which includes several reinforcing ribs 118 running longitudinally, laterally and diagonally over the upper surface 116. It is contemplated that the size, shape and orientation of ribs 118 could vary depending on the particular intended use of the ski 70.

Figure 7:
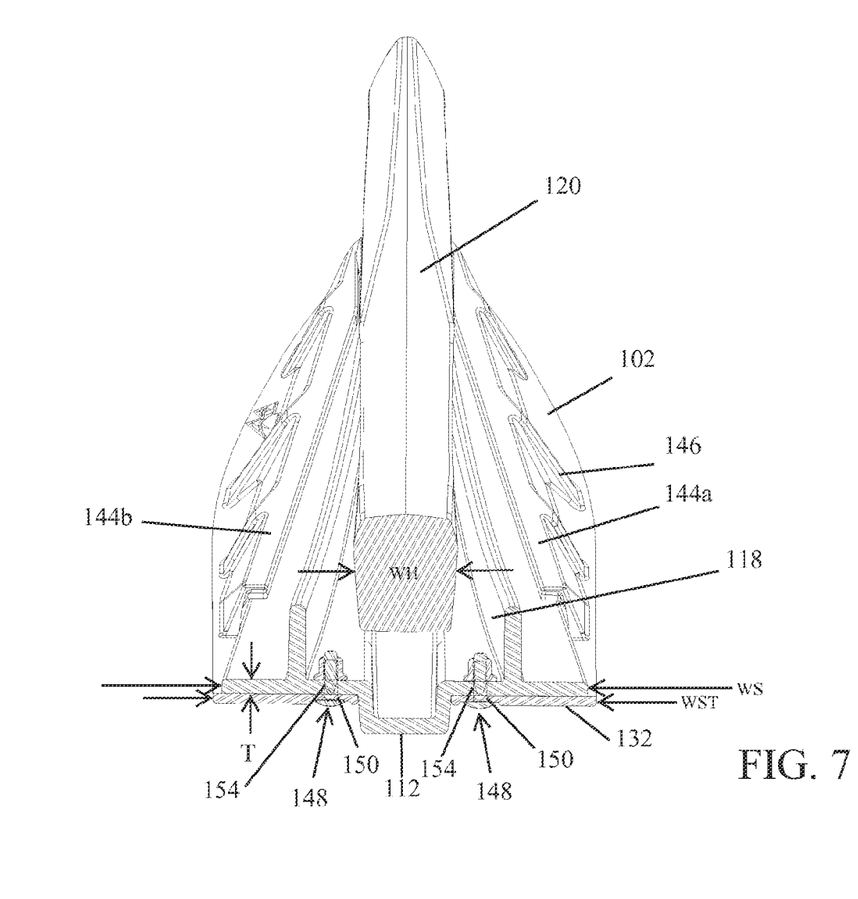
FIG. 7 is a cross-sectional view of the ski and ski tip of FIG. 2, taken along line 7-7 of FIG. 2 showing a first method of fastening the ski tip to the ski.

A handle 120 is connected to the upturned front end 108 of ski 70. The handle 120 enhances the structural rigidity of the front end 108 of the ski 70 and provides a grip to displace the ski 70 and/or the snowmobile 10. The handle 120 has a front end 122 attached to the front end 126 of the ski 70 via fasteners 125 along an axis 127 and a rear end 124 attached to the ski 70 via fasteners 128 along an axis 129 near the junction between the middle section 106 and the upturned front end 108. The handle 120 has an inverted u-shape to create sufficient space between the handle 120 and the upper surface 116 of the ski 70 for the user to grasp the handle 120. As best seen in FIG. 7, the handle 120 has a width WH along its length that is dimensioned so the handle 120 can easily be grasped by the hand of a person. The width WH is less than the width of the ski 70 and ski tip 102 along its entire length. The particular shape of handle 120 will depend on factors such as the desired use of the ski 70 and aesthetics.

With reference to FIG. 3, it can be seen that the upturned front end 108 has a width W1 near the junction of the upturned front end 108 and the middle portion 106 and a width W2 near its front end 126. The width W1 is greater than the width W2 and as seen, the width of the upturned front end 108 gradually narrows toward the forward direction of the ski tip 102 and in particularly between axes 127 and 129. The combination of the upturning and narrowing of the front end 108 enables the ski 70 to travel through the snow with little resistance. In particular, in dense snow applications, a narrow front end 108 reduces the force of the snow onto the front end 108 of the ski 70 thus preventing the rotating of the ski 70 about the pivot axis 130 between the ski 70 and its corresponding ski leg 74. This enables the ski 70 to remain flat and continue through the snow with little resistance. Were the force of the snow on the front end 108 great enough to rotate the ski about pivot axis 130 in the direction of the arrow A in FIG. 1, the overall resistance to push the skis 70 through the snow would increase and could cause a loss of forward momentum of the snowmobile 10. This can increase the effort required by the driver when crossing a slope on one ski 70, which is known as "side-hilling" and is often practiced by snowmobilers in deep snow conditions. In this particular maneuver, a good balance of floatation versus forward momentum is desired because any sudden change in either can cause the driver to abort the maneuver.

While a narrow front end 108 is sometimes desired as described above, there are some snow conditions where a wider front end 108 is desired. As described above, the snow contacting the front end 108 can cause the ski 70 to rotate about the axis 130. In deep, light snow conditions, it can be desirable to have the ski 70 to travel less deep into the snow, which could otherwise cause other portions of the snowmobile 10 to drag in the snow and thus increase the effort require by the driver for certain maneuvers. A wider front end, such as that created when the ski tip 102 is installed, will cause the ski 70 to have more floatation and thus will not sink as far into the snow and will tend to raise the front of the snowmobile 10 compared to a ski with a narrower front end in the same snow conditions.

While changing skis with a different front end shape is a consideration, it is very costly and time consuming to do so and cannot practically be done once the user is away from a place to store the second set of skis. Also, the desired reaction of the ski 70 to the snow conditions may differ from one user to the next, thus the present technology allows for different ski tips 102 so the user has the ability to easily and quickly modify their skis 70 because ski tips 102 can be easily stored on the snowmobile 10, brought with the user snowmobiling and be added to or removed from the skis 70 on-site.

Figure 4:
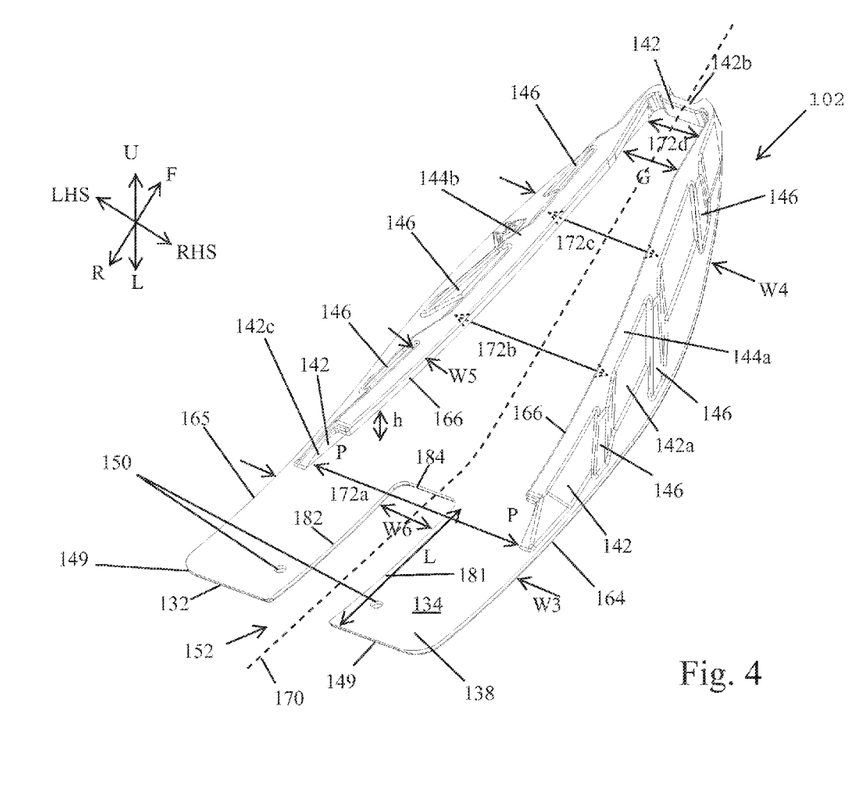
FIG. 4 is a perspective view taken from a rear, right side of the ski tip of FIG. 3.

FIG. 4 shows one implementation of a ski tip 102. The ski tip 102 has a smooth body 132 having a top surface 134 and a bottom surface 136 (FIG. 5). The body 132 has a slightly upturned front end shape to be congruous to that of the front end 108 of the ski 70 so ski tip 102 slidingly fits over the front end 108 of the ski 70 as will be described in greater detail below. The body 132 of ski tip 102 has a right side peripheral edge 164 and a left side peripheral edge 165 which converge toward each other in the forward direction such that the body 132 of ski tip 102 has an overall width W3 near the rear end 138 and an overall width W4 near the front end 140. As can be seen, the width W3 is greater than the width W4 and the ski tip 102 gradually decreases in width from the rear end 138 toward the front end 140. With reference to FIG. 2, the ski 70 narrows from width W3 to width W4 along at least a portion of the upturned front end 108 of the ski 70 when the ski tip 102 is installed. In particular, the ski 70 narrows, at least partially, between axes 127 and 129. It is contemplated that the ski tip 102 could have different profiles in terms of width between the rear end 138 and the front end 140. For example, the width between the rear end 138 and the front end 138 could decrease at a constant rate over the entire length of the ski tip 102 or the width could remain relatively constant for a first length from the rear end 138 of the ski tip 102 and then begin to decrease constantly or variably toward the front end 140 of the ski tip 102. The particular widths of the ski tip 102 will depend on the particular use of the ski 70 for which the ski tip 70 is adapted to fit. As mentioned above, it is desired to increase the width of the front end 108 of the ski 70 when the ski tip 102 is installed thereto in order to obtain the desired results mentioned above.

Again with reference to FIG. 4, to facilitate the connection between the ski tip 102 and the ski 70, ski tip 102 has side walls 142 extending generally vertically upward from the upper surface 134 of the body 132. A right side wall 142a closely follows the right peripheral edge 164 along a portion of the right hand side of the body 132. A left side wall 142c closely follows the peripheral edge 165 along a portion of the left hand side of the body 132. A central side wall 142b connects the right side wall 142a and the left side wall 142c near the front end 140 of the ski tip 102. The right and left side walls 142a and 142c are distanced from each other such that a varying gap 172 is formed therebetween. As can be seen in FIG. 4, the gap 172 has a width 172a near the rear end 138 of the body 132 and gradually decreases in width as shown through gap widths 172b, 172c and 172d near the front end 140 of the ski tip 102. The gap 172 is shaped and dimensioned according to a ski onto which ski tip 102 is intended to fit, thus it should be understood that the gap 172 will closely relate to the width and shape of a front end of a ski, which in the present implementation is the front end 108 of the ski 70.

Top walls 144 extend generally laterally inwards from the side walls 142a, 142b. The top walls 144 include a right top wall 144a and left top wall 144b. The right top wall 144a extends laterally inward from the right side wall 142a towards the longitudinal centerline 170 of the ski tip 102 along at least a portion of the right side wall 142a. The left top wall 144b extends laterally inward from the left side wall 142c towards the longitudinal centerline 170 of the ski tip 102 along at least a portion of the left side wall 142c. The body 132, the right side wall 142a, the right top wall 144a, the left top wall 144b and the left side wall 142c create a pocket P into which the front end 108 of ski 70 slidingly fits and once installed, prevents the ski tip 102 from sliding further rearward or from being removed other than by forwardly sliding the ski tip 102 relative to the ski 70.

The top walls 144 extend from side walls 142 toward the longitudinal centerline 170 of the ski tip 102 at a height h from the top surface 134. The height h is slightly larger than the thickness T (FIGS. 6 and 7) of the front end 108 of ski 70 so that the front end 108 of the ski 70 may enter between the top wall 144 and the body 132 without unnecessary slack or tightness. The top walls 144 have a lateral width W5 (FIG. 4) such the top walls 144 do not interfere with the ribs 118 of the ski 70 and which may otherwise prevent the ski tip 102 from being installed. It is contemplated that for a ski without ribs 118 at the front end 108, the width W5 of the top walls 144 could be larger than that shown in FIG. 4 while still providing a sufficient gap G between lateral edges 166 of the top walls 144a and 144b for the handle 120 to pass.

With reference to FIG. 4, while the side walls 142a, 142b and 142c are shown as being connected to each other to form a continuous wall, it is contemplated that the side wall 142a, 142b and 142c could be separated from each other. It is also contemplated that the side walls 142a and 142c could extend along the body 132 from the front end 140 to the rear edge 149 of the body 132. Reinforcing ribs 146 extend between the side and top walls 142, 144 and the top surface 134 of the body 132 to increase the structural rigidity of the ski tip 102. The reinforcing ribs 146 connect the walls 142, 144 with the top surface 134 of the body 132 within the peripheral edges 164 and 165 of the body 132 on the exterior of the walls 142 and 144 so as not to interfere with the pocket P. The side wall 142b is not provided with a top wall due to the particular design of the handle 120 in the present implementation. It is contemplated that with a different handle design, the side wall 142b could also have a top wall.

As can also be seen in FIG. 4, the body 132 further includes an open-ended notch 152. The open-ended notch 152 opens at the rear end 138 of the ski tip 102 and has a right side 181, a left side 182 and a front side 184. When the ski tip 102 is installed onto the ski 70, the keel 112 fits partially within the notch 152 between the left side 182 and the right side 181. The width W6 and the length L of the notch are dimensioned such that keel 122 fits therein and does not prevent the complete installation of the ski tip 102 onto the ski 70. The rear edge 149 of the body 132 has a chamfer 151 (FIG. 5) to provide a smooth transition from the bottom surface 136 of the ski tip 102 to the lower running surface 104 of the ski 70. As can also seen in FIG. 4, the right side wall 142a and left side wall 142c extend rearward past the front side 184 of notch 152 but do not extend to the rear edge 149 of the body 132 such that the portion of the body 132 between the rear edge 149 and the left and right side walls 142a, 142c is free of ribs and/or walls and remains more flexible than the portion of the body 132 with the left and right side walls 142a and 142c and the ribs 146. It is contemplated that the side walls 142a, 142c and/or the ribs 146 could extend closer to or up to the rear edge 149.

With reference to FIG. 7, fasteners 148 passing through holes 150 in the ski tip 102 and holes 154 in the ski 70 removably fix the ski tip 102 to the ski 70. The fasteners 148 shown in FIG. 7 consist of a nut and bolt type fastener but one would appreciate that any type of fastener could be used. In one implementation, the type of fastener 148 used is one that can be easily removed without or with tools that can be practically carried with the user while snowmobiling. As also seen in FIG. 7, the width WS of the ski 70 is smaller than the width WST of the ski tip 102.

Figure 8:
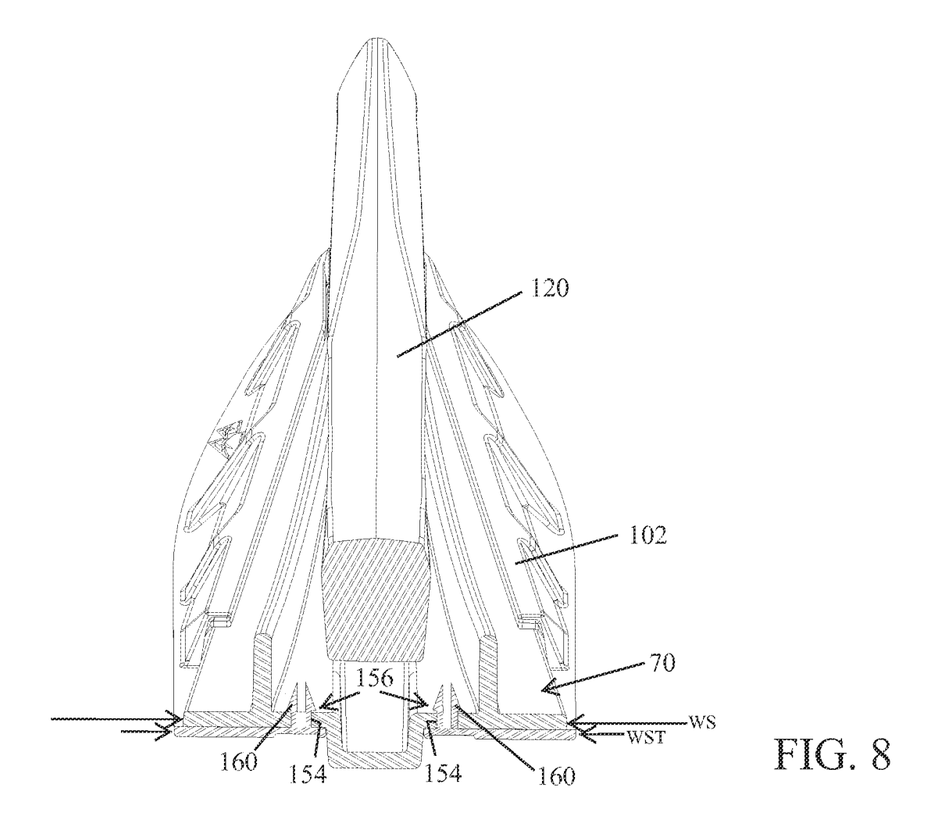
FIG. 8 is a cross-sectional view of a ski and ski tip showing an alternative method of fastening the ski tip to the ski.

FIG. 8 shows an alternate method of removably fixing the ski tip 102 to the ski 70. In this alternative implementation, the ski tip 102 includes one or more pairs of pins 156 passing through the holes 154 in the ski 70. In this implementation, the pins 156 are integrally formed with the ski tip 102 so the ski tip 102 does not have the holes 150, but it is contemplated that the pins 156 could be separate, in which case the pins 156 would be also be inserted though the holes 150 of the ski tip 102. In this implementation, when the ski tip 102 is installed, enlarged top portions 160 of the pins 156 prevent the pins 156 from passing through the holes 154. The pins 156 of each pair of pins 156 is can be squeezed toward each other such that the enlarged top portions 160 will pass though the holes 154 and thus enable the ski tip 102 to be slid forward and removed from the ski 70. As mentioned above, ski tip 102 can be fabricated from UHMWPE and thus is flexible enough to disengage the pins 156 from the holes 154 in the ski 70.

Figure 9:
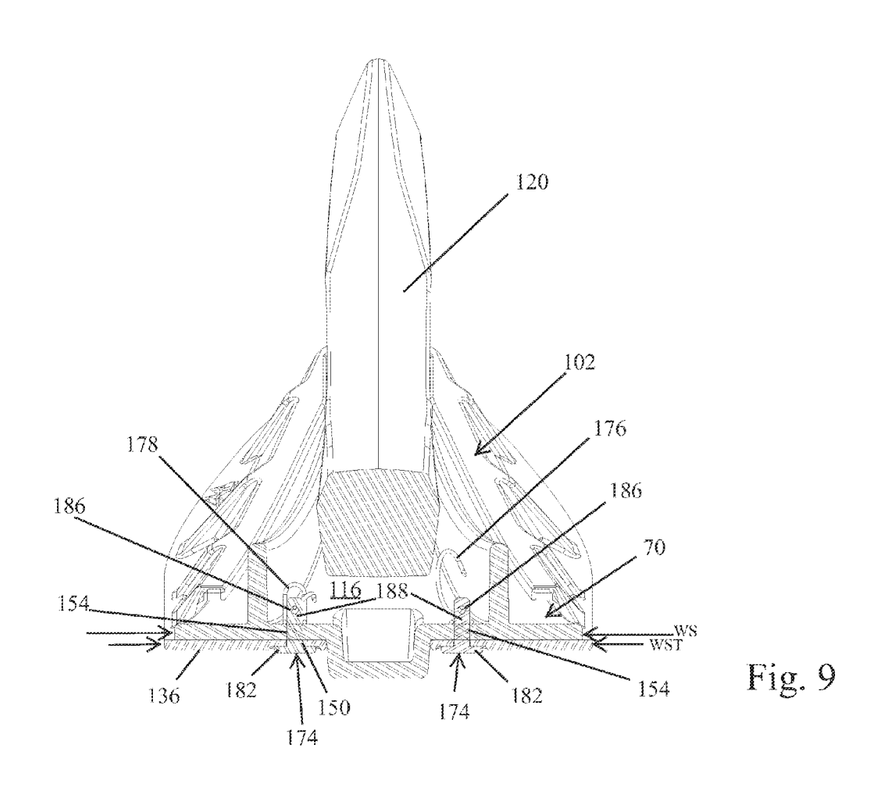
FIG. 9 is a cross-sectional of a ski and ski tip showing another alternative method of fastening the ski tip to the ski.

With reference to FIG. 9, yet another type of fastener will be described. Each fastener 174 has a flat head portion 182 and a shank portion 188 extending from the head portion 182. The shank portions 188 pass through the holes 150 and 154 in the ski tip 102 and the ski 70 respectively and prevent any relative longitudinal movement between the ski tip 102 and the ski 70. Each shank portion 188 defines an aperture 186 passing through the shank portion 188. The aperture 186 is situated along the shank portion 188 which extends above the upper surface 116 of the ski 70. Pins 176, 178 are inserted through the apertures 186 to prevent the fasteners 174 from disengaging from the ski tip 102 and the ski 70. The pins 176, 178 also apply a force onto the upper surface 116 of the ski 70 to hold the head portions 182 of the fasteners 174 in contact with the bottom surface 136 of the ski tip 102.

The fasteners 154 and 174 require no tool to be unfastened, thus removal of the ski tip 102 from ski 70 can be easily done on-site. It is contemplated that other types of tool-less fasteners could be used.

It is contemplated that the snowmobile 10 and snowmobile ski 70 may have other features and components which would be readily recognized by one of ordinary skill in the art, thus further explanation and description of these components will not be provided herein.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A snowmobile ski tip for a snowmobile ski comprising:
   a body, the body having:
      a bottom surface for contacting snow;
      a top surface for contacting a bottom surface of the ski;
      a right side peripheral edge;
      a left side peripheral edge, the right and left side peripheral edges extending from a rear end toward a front end of the body;
      a first width between the right side and left side peripheral edges at the rear end of the body; and
      a second width between the right side and left side peripheral edges at the front end of the body,
      the first width being greater than the second width such that a width of the body narrows from the rear end to the front end of the body;
   a right side wall extending from the top surface of the body, the right side wall being disposed laterally between the right side peripheral edge and a longitudinal centerline of the body, the right side wall being at least in part laterally spaced from the right side peripheral edge;
   a left side wall extending from the top surface of the body, the left side wall being disposed laterally between the left side peripheral edge and the longitudinal centerline of the body, the left side wall being at least in part laterally spaced from the left side peripheral edge;
   a right top wall extending laterally from the right side wall toward the longitudinal centerline; and
   a left top wall extending laterally from the left side wall toward the longitudinal centerline, the body, the right side wall, the left side wall, the right top wall, and the left top wall forming a pocket for receiving a front end of the ski.

2. The ski tip of claim 1, wherein the right and left top walls extend from the right and left side walls at a height along the right and left side walls that is greater than a thickness of the ski.

3. The ski tip of claim 1, wherein:
the right side wall extends vertically upward from the body and extends at least partially adjacent the right side peripheral edge of the body, and
the left side wall extends vertically upward from the body and extends at least partially adjacent the left side peripheral edge of the body.

4. The ski tip of claim 3, wherein the right side wall is distanced from the left side wall so as to create a gap therebetween, the gap having a first dimension near the rear end of the body and a second dimension near the front end of the body such that the gap decreases from the rear end of the body to the front end of the body.

5. The ski tip of claim 1, wherein the body defines an open-ended notch for receiving a portion of a keel of the ski, the notch opening toward the rear end of the body such that when the ski tip is installed onto the ski, a portion of the keel of the ski enters through the notch and a portion of the body extends along the keel.

6. The ski tip of claim 5, wherein the notch has a right side, a left side and a front side, and the right side wall and the left side wall extend rearward of the front side of the notch.

7. The ski tip of claim 1, wherein the left top wall has a first width extending in a lateral direction of the ski tip between the left side wall and an inner lateral edge of the left top wall, and the right top wall has a second width extending in the lateral direction of the ski tip between the right side wall and an inner lateral edge of the right top wall such that an opening between the left top wall and the right top wall allows a handle of the ski to pass therethrough.

8. The ski tip of claim 7, wherein the opening between the lateral edges of the left top wall and the right top wall is narrower than a gap between the right side wall and the left side wall.

9. The ski tip of claim 8, wherein the gap between the right side wall and the left side wall is slightly larger than a corresponding width of the ski.

10. The ski tip of claim 1, wherein the first width and the second width of the body are greater than corresponding widths of the ski.

11. A snowmobile ski tip for a snowmobile ski comprising:
a body, the body having:
a bottom surface for contacting snow;
a top surface for contacting a bottom surface of the ski;
a right side peripheral edge; and
a left side peripheral edge, the right and left side peripheral edges extending from a rear end toward a front end of the body;
a right side wall disposed on a right side of a longitudinal centerline of the body, the right side wall extending vertically upward from the top surface of the body and extending at least partially adjacent the right side peripheral edge of the body;
a left side wall disposed on a left side of the longitudinal centerline of the body, the left side wall extending vertically upward from the top surface of the body and extending at least partially adjacent the left side peripheral edge of the body;
a right top wall extending laterally from the right side wall toward the longitudinal centerline;
a left top wall extending laterally from the left side wall toward the longitudinal centerline,
the body, the right side wall, the left side wall, the right top wall and the left top wall forming a pocket for receiving a front end of the ski;
at least one right reinforcing rib between the right side wall and the top surface of the body within the right side peripheral edge of the body; and
at least one left reinforcing rib between the left side wall and the top surface of the body within the left side peripheral edge of the body.

12. The ski tip of claim 11, wherein the top surface of the body is free of walls and ribs between a rear edge of the body and rear ends of the left and right side walls.

13. The ski tip of claim 11, wherein the right and left top walls extend from the right and left side walls at a height along the side walls that is greater than a thickness of the ski.

14. The ski tip of claim 11, wherein:
the body has a first width between the right side and left side peripheral edges at the rear end of the body and a second width between the right side and left side peripheral edges at the front end of the body, and
the first width is greater than the second width such that a width of the body narrows from the rear end to the front end of the body.

15. The ski tip of claim 14, wherein the body defines an open-ended notch for receiving a portion of a keel of the ski, the notch opening toward the rear end of the body such that when the ski tip is installed onto the ski, a portion of the keel of the ski enters through the notch and a portion of the body extends along the keel.

16. The ski tip of claim 14, wherein the first width and the second width of the body are greater than corresponding widths of the ski.

17. The ski tip of claim 15, wherein the notch has a right side, a left side and a front side, and the right side wall and the left side wall extend rearward of the front side of the notch.

18. The ski tip of claim 11, wherein the right side wall is distanced from the left side wall so as to create a gap therebetween, the gap having a first dimension near the rear end of the body and a second dimension near the front end of the body such that the gap decreases from the rear end of the body to the front end of the body.

19. The ski tip of claim 11, wherein the left top wall has a first width extending in a lateral direction of the ski tip between the left side wall and an inner lateral edge of the left top wall, and the right top wall has a second width extending in the lateral direction of the ski tip between the right side wall and an inner lateral edge of the right top wall such that an opening between the left top wall and the right top wall allows a handle of the ski to pass therethrough.

* * * * *